United States Patent
Rice

(10) Patent No.: US 9,569,419 B1
(45) Date of Patent: Feb. 14, 2017

(54) ASSOCIATIVE RELATIONSHIP BASED RECOMMENDATIONS

(71) Applicant: Amazon Technologies, Inc., Reno, NV (US)

(72) Inventor: Ronald Allen Rice, Lake Forest Park, WA (US)

(73) Assignee: Amazon Technologies, Inc., Reno, NV (US)

(*) Notice: Subject to any disclaimer, the term of this patent is extended or adjusted under 35 U.S.C. 154(b) by 506 days.

(21) Appl. No.: 13/950,072

(22) Filed: Jul. 24, 2013

(51) Int. Cl.
*G06F 17/30* (2006.01)
*G06F 17/27* (2006.01)

(52) U.S. Cl.
CPC .................. *G06F 17/2705* (2013.01)

(58) Field of Classification Search
None
See application file for complete search history.

(56) References Cited

U.S. PATENT DOCUMENTS

| 2005/0102300 A1* | 5/2005 | Madsen | G06F 17/30902 |
| 2008/0250450 A1* | 10/2008 | Larner | G06Q 30/0256 725/34 |
| 2009/0327916 A1* | 12/2009 | Baran | G06Q 30/02 715/745 |

* cited by examiner

Primary Examiner — Wilson Lee
(74) Attorney, Agent, or Firm — Lee & Hayes, PLLC

(57) ABSTRACT

The systems and/or processes described herein may establish a controlled and limited vocabulary that may serve as explicit associative relationships. The explicit associative relationships may define the nature of relationships between items and/or categories of items. In response to determining that a user has interacted with or selected an item via a website, an application, etc., associated with a service provider, explicit associative relationships associated with the selected item may be parsed in order to identify additional items related to the selected item. The additional related items may then be dynamically recommended to the user via the website, the application, etc., associated with the service provider.

20 Claims, 6 Drawing Sheets

| ITEM(S) 302 | RELATED ITEM(S) 304 | EXPLICIT ASSOCIATIVE RELATIONSHIPS 306 |
|---|---|---|
| ELECTRIC GUITAR | GUITAR AMPLIFIER | ELECTRIC GUITARS HAVE ESSENTIAL EQUIPMENT GUITAR AMPLIFIERS |
| | GUITAR STAND | ELECTRIC GUITARS HAVE ESSENTIAL ACCESSORY GUITAR STANDS |
| | GUITAR STRAP | ELECTRIC GUITARS HAVE ESSENTIAL ACCESSORY GUITAR STRAPS |
| | GUITAR PICKS | ELECTRIC GUITARS HAVE CONSUMABLE ACCESSORY GUITAR PICKS |
| | ELECTRIC GUITAR STRINGS | ELECTRIC GUITARS HAVE CONSUMABLE ACCESSORY ELECTRIC GUITAR STRINGS |
| | GUITAR BAG | ELECTRIC GUITARS HAVE RECOMMENDED ACCESSORY GUITAR BAGS |
| | GUITAR CASE | ELECTRIC GUITARS HAVE RECOMMENDED ACCESSORY GUITAR CASES |
| | GUITAR EFFECTS | ELECTRIC GUITARS HAVE RECOMMENDED EQUIPMENT GUITAR EFFECTS |
| | INSTRUCTIONAL MEDIA | ELECTRIC GUITARS HAVE INSTRUCTIONAL MEDIA GUITAR BOOKS |
| | | ELECTRIC GUITARS HAVE INSTRUCTIONAL MEDIA GUITAR DVDs |
| | | ELECTRIC GUITARS HAVE INSTRUCTIONAL MEDIA GUITAR SOFTWARE |

FIG. 3

ASSOCIATIVE RELATIONSHIP BASED RECOMMENDATIONS

BACKGROUND

Consumers continue to shop, search for, and purchase items (e.g., products, services, etc.) from websites that are operated by merchants and/or service providers. While navigating those websites, the consumers may receive recommendations for items that the merchant and/or the service provider believe to likely be of interest to the consumers. Some of these recommendations may be based on transactional data. For instance, if two items are frequently purchased together, and a consumer views, searches for, or purchases one of those items, the other item may be recommended to that consumer. However, the fact that the items have been purchased together does not necessarily mean that those items are related, or that both items would be of interest to the consumer. In other instances, the recommendations may be based on behavioral data, which may correspond to the viewing, search, navigation, and/or purchase history of a consumer, or a manner in which the consumer navigates through a website. Yet, such behavioral data may not accurately reflect the interests or preferences of that user. As a result, establishing relationships between items based on such data may result in the consumer having little to no interest in recommendations provided thereto.

BRIEF DESCRIPTION OF THE DRAWINGS

The detailed description is set forth with reference to the accompanying figures, in which the left-most digit of a reference number identifies the figure in which the reference number first appears. The use of the same reference numbers in the same or different figures indicates similar or identical items or features.

FIG. 3 is a diagram showing examples of explicit associative relationships between an item and a plurality of related items.

DETAILED DESCRIPTION

Figure 1:
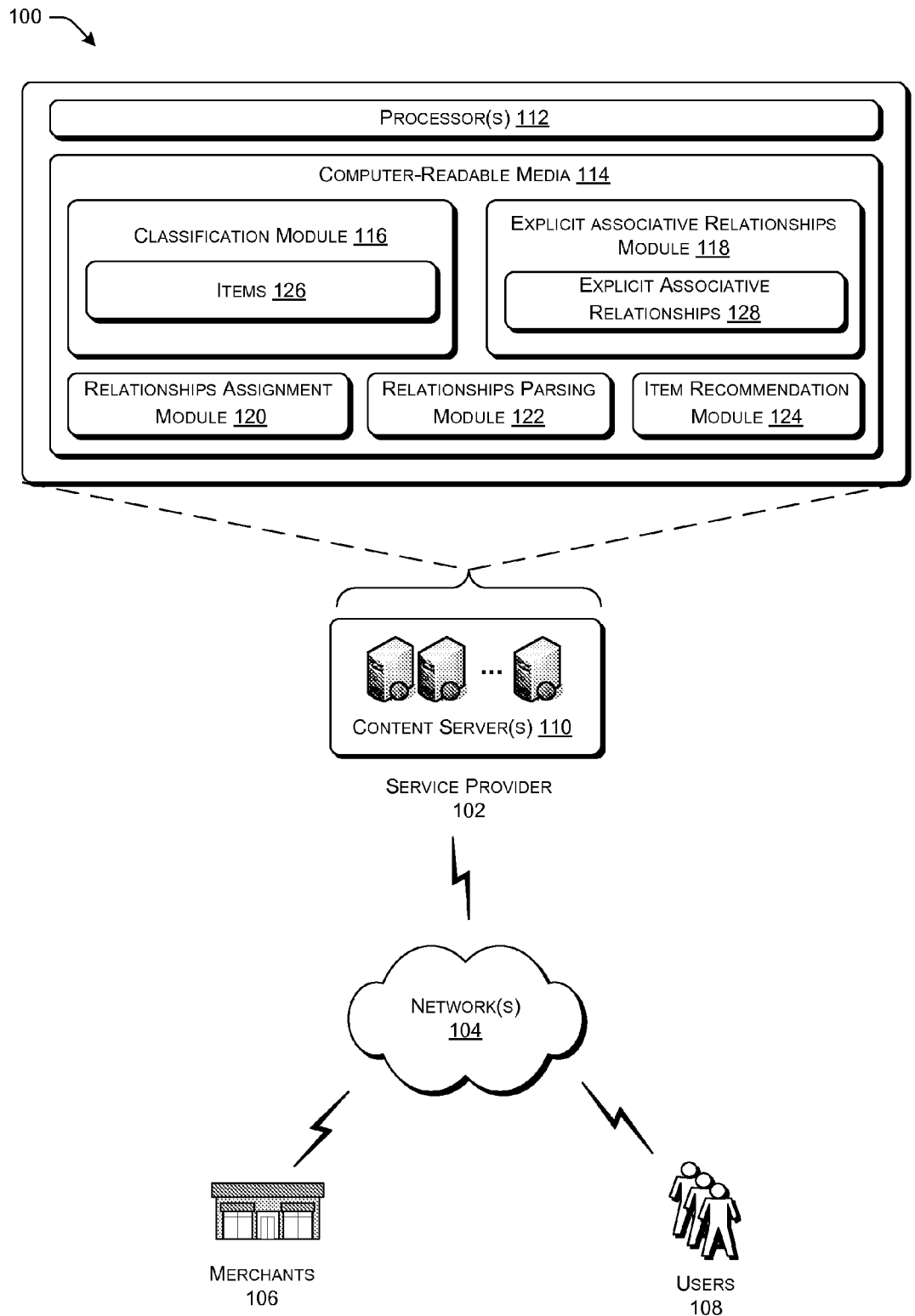
FIG. 1 is a diagram showing an example system for recommending items to consumers based on explicit associative relationships between the items.

This disclosure describes systems and processes for recommending items to consumers based on explicit associative relationships between items (e.g., products, services, etc.) and/or categories of items. More particularly, the systems and processes described herein may establish a controlled and limited vocabulary that may serve as explicit associative relationships between items and/or category of items. This limited vocabulary may define the nature of the relationship between two items and/or category of items. For instance, regarding a particular item, the limited vocabulary may indicate whether other items are consumable, accessories, suggested, essential, etc. As a result, the explicit associative relationships may determine or indicate how two different items and/or categories of items are related to one another, and the strength of that relationship.

Upon establishing various types of explicit associative relationships, the systems and/or processes described herein may determine or assign particular explicit associative relationships between items and/or categories of items. Multiple types of data may be utilized to make such determinations, such as transactional data, consumer keyword searches, consumer input, merchant input, and so on. The explicit associative relationships between items and/or categories of items may be stored for subsequent analysis.

In response to determining that a consumer has selected (e.g., searched for, viewed, clicked on, etc.) a particular item, such as by searching for, viewing, clicking on, purchasing, etc., the item via a website or an application associated with a service provider, the systems and/or processes described herein may parse the explicit associative relationships between the selected item and other items or categories of items. That is, the systems and/or processes described herein may identify items and/or categories of items that may be related to the selected item. Such related items may include items that are essential to the use of the selected item, accessories to the selected item, suggested items that may be used with the selected item, instructional content (e.g., books, video content, audio content, etc.), and so on. The related items may then serve as recommendations that may be presented to the consumer via the website or application, which may allow the user to become informed of additional items that are related to the selected item. In some embodiments the recommended items may be characterized in a manner that indicates their relation to the selected item (e.g., must-have items, suggested items, accessories, instructional media, etc.).

In various embodiments, the recommended items may be useful for particular types or categories of items (e.g., sophisticated or complex items, high priced items, etc.). For example, for a more sophisticated or complex item, consumers may be unaware of related items that are essential for the use of that item. By presenting to the consumer a list of relevant and related items, the consumer may become a more informed customer and may be more willing to purchase that item (and the related items) from the service provider.

Furthermore, presentation of recommended items relating to a selected item may be targeted to consumers who are getting started with a new kind of item or category of items. For example, assume that a consumer wants to learn to play the electric guitar, but is not overly knowledgeable about electric guitars or the items that are related thereto. Further assume that the consumer is shopping for his/her first electric guitar on a service provider-operated website, which may offer multiple different brands of electric guitars for purchase. Had the consumer visited a brick-and-mortar store, a sales associate might have told the consumer about other products that they will also need to play the instrument (e.g., an amplifier, a guitar stand, a protective case or bag, picks, a few sets of replacement strings, etc.). Such guidance may be helpful for a consumer that is new to a particular product and/or product category. However, existing online shopping tools are not specifically tailored to this scenario. As a result, by establishing and leveraging explicit associative relationships that define the nature of relationships between items and/or category of items, the systems and processes described herein may recommend items that are relevant to an item that is believed to be of interest to a consumer.

This brief introduction, including section titles and corresponding summaries, is provided for the reader's convenience and is not intended to limit the scope of the claims, nor the proceeding sections. Furthermore, the techniques described above and below may be implemented in a number of ways and in a number of contexts. Several example implementations and contexts are provided with reference to the following figures, as described below in more detail. However, the following implementations and contexts are but a few of many.

Example Environment

FIG. 1 illustrates an example system 100 for establishing and determining explicit associative relationships between items and/or category of items and then leveraging the explicit associative relationships in order to recommend items (e.g., products, services, etc.) to consumers. More particularly, the system 100 may include a service provider 102, one or more network(s) 104, one or more merchants 106 and one or more users 108. As shown, the service provider 102 may include one or more content server(s) 110, which may include one or more processor(s) 112 and computer-readable media 114. The computer-readable media 114 may include a classification module 116, an explicit associative relationships module 118, a relationships assignment module 120, a relationships parsing module 122 and an item recommendation module 124. Moreover, the classification module 116 may be associated with one or more items 126 and the explicit associative relationships module 118 may create and maintain explicit associative relationships 128 between the items 126 and/or categories of items 126.

The service provider 102 may be any entity, service, platform, deal sourcer or any number of servers (e.g., content servers 110) that may provide or offer for acquisition products, services, promotions, recommendations and/or deals to consumers, possibly on behalf of the merchants 106. More particularly, the service provider 102 may establish a limited or controlled vocabulary that defines the nature of relationships between items 126 and/or category of items 126. This vocabulary may indicate whether items 126 are related to one another and the nature of the relationship, such as whether an item 126 is an essential item 126, a suggested item 126, an accessory, a consumable item 126, etc., with respect to a different item 126. Such explicit associative relationships 128 between items 126 and/or category of items 126 may be determined and maintained for the purpose of recommending items 126 to consumers. For instance, when a user 108 selects (e.g., searches for, views, clicks on, navigates to, purchases, etc.) an item 126, the service provider 102 may parse or search the explicit associative relationships 128 relating to the selected item 126 in order to identify related items 126 that are relevant to the selected item 126. Then, the related items 126 may be recommended to the user 108, which may allow the user 108 to make more informed purchasing decisions. The items 126 and such recommendations may be presented via a site, website, platform, portal, application, etc., that is accessible to the users 108 via corresponding user devices.

In some embodiments, the network(s) 104 may be any type of network known in the art, such as the Internet. Moreover, the service provider 102, the merchants 106 and the users 108 may communicatively couple to the network(s) 104 in any manner, such as by a wired or wireless connection. The network(s) 104 may also allow the service provider 102 to present items 126 and/or recommendations to the users 108 via a website, application, a merchant marketplace, etc., associated with the service provider 102. The network(s) 104 may also facilitate communication between the content servers 110 and devices associated with the merchants 106 and the users 108.

In various embodiments, the one or more merchants 106 may be any individual or entity that is a source or a distributor of items 126 (e.g., products, services, etc.) that may be viewed, searched for, or acquired by the users 108. For example, the merchants 106 may include entities that provide products or services to consumers, which may be offered or promoted by the service provider 102 on behalf of the merchants 106.

In some embodiments, the users 108 may operate corresponding user devices to perform various functions associated with the user devices, which may include one or more processor(s), computer-readable media, and a display. Furthermore, the users 108 may utilize the user devices to access a website or merchant marketplace operated by the service provider 102, to access an application associated with the service provider 102, and so on, for the purpose of viewing items 126 provided by the service provider 102 and/or the merchants 106, searching for the items 126 and/or acquiring the items 126. In response to a user 108 selecting an item 126, one or more recommendations that identify items 126 related to the selected item 126 may be presented to the user 108.

Moreover, and as shown, the service provider 102 may include one or more content servers 110, which may include one or more processors 112 and computer-readable media 114, which may include the classification module 116, the explicit associative relationships module 118, the relationships assignment module 120, the relationships parsing module 122 and the item recommendation module 124. The content servers 110 may also include additional components not listed above that may perform any function associated with the content servers 110. In various embodiments, each of the content servers 110 may be any type of server, such as a network-accessible server.

In various embodiments, the processor(s) 112 may execute one or more modules and/or processes to cause the content servers 110 to perform a variety of functions, as set forth above and explained in further detail in the following disclosure. In some embodiments, the processor(s) 112 may include a central processing unit (CPU), a graphics processing unit (GPU), both CPU and GPU, or other processing units or components known in the art. Additionally, each of the processor(s) 112 may possess its own local memory, which also may store program modules, program data, and/or one or more operating systems.

In at least one configuration, the computer-readable media 114 of the content servers 110 may include any components that may be used to interact with the merchants 106 and/or the users 108. Depending on the exact configuration and type of the content servers 110, the computer-readable media 114 may also include volatile memory (such as RAM), non-volatile memory (such as ROM, flash memory, miniature hard drive, memory card, or the like), or some combination thereof.

The items 126 provided by the service provider 102, possibly on behalf of the merchants 106, may be acquired by the users 108 via one or more physical locations, via the service provider 102 (e.g., a merchant marketplace that provides items 126 on behalf of the merchants 106), via one or more sites (e.g., a merchant site, a deal provider, an online retailer site, websites, etc.), via any type of user device, at the point of a transaction or interaction with a merchant 106, or combinations thereof. The service provider 102 and/or the merchants 106 may also provide items 126 acquired by individuals to locations specified by the individuals, such as via mobile services, delivery, etc. In addition, the acquisition of items 126 from the service provider 102 may be achieved through various means of providing value for the items 126, such as purchasing items 126, renting items 126, leasing items 126, borrowing items 126, trading items 126, bartering items 126, etc.

In various embodiments, the classification module 116 may determine and maintain a classification and/or taxonomy of a catalog of items 126 that are offered for acquisition by the service provider 102. More particularly, the classification module 116 may determine various relationships between the items 126 and/or categories of the items 126. Such relationships may include hierarchical relationships, equivalence relationships and/or associative relationships, which will be discussed in additional detail below.

Moreover, the explicit associative relationships module 118 may establish a controlled and limited vocabulary that may be utilized to define the nature of relationships between the items 126 and/or categories of items 126, which may be referred to as explicit associative relationships 128. In various embodiments, each explicit associative relationship 128 may include one or more words or phrases that indicate how a first item 126 or a first category of items 126 is related to a second item 126 or a second category of items 126, respectively. As a result, the explicit associative relationships 128 may indicate the extent to which two items 126 are related, such as one of the items 126 being an essential item 126, a suggested item 126, an accessory, a consumable item 126, etc., with respect to the other item 126.

The relationships assignment module 120 may assign the explicit associative relationships 128 between the items 126 and/or the categories of items 126. For example, with respect to a first item 126, the relationships assignment module 120 may determine whether a second item 126 is related to the first item 126. More particularly, the relationships assignment module 120 may determine whether the second item 126 is a essential item 126, a suggested item 126, an accessory, a consumable item 126, etc., with respect to the first item 126.

In response to determining that a user 108 has selected (e.g., viewed, clicked on, searched for, purchased, etc.) an item 126, the relationships parsing module 122 may parse or search the explicit associative relationships 128 between the selected item 126 and other items 126 for the purpose of identifying items 126 related to the selected item 126. As a result, the relationships parsing module 122 may identify items 126 that are relevant and related to the selected item 126.

In various embodiments, after the user 108 has selected one of the items 126, the item recommendation module 124 may recommend one or more of the related items 126 identified by the relationships parsing module 122. The recommended items 126 may be presented to the user 108 via the website, portal, application, platform, etc., that the user 108 utilized to select the selected item 126. As shown in additional detail with respect to FIG. 4, the service provider 102 may display the recommended items 126 in different tabs, categories, pages, etc., based on the items' 126 explicit associative relationship 128 with the selected item 126.

Example Content Server

Figure 2:
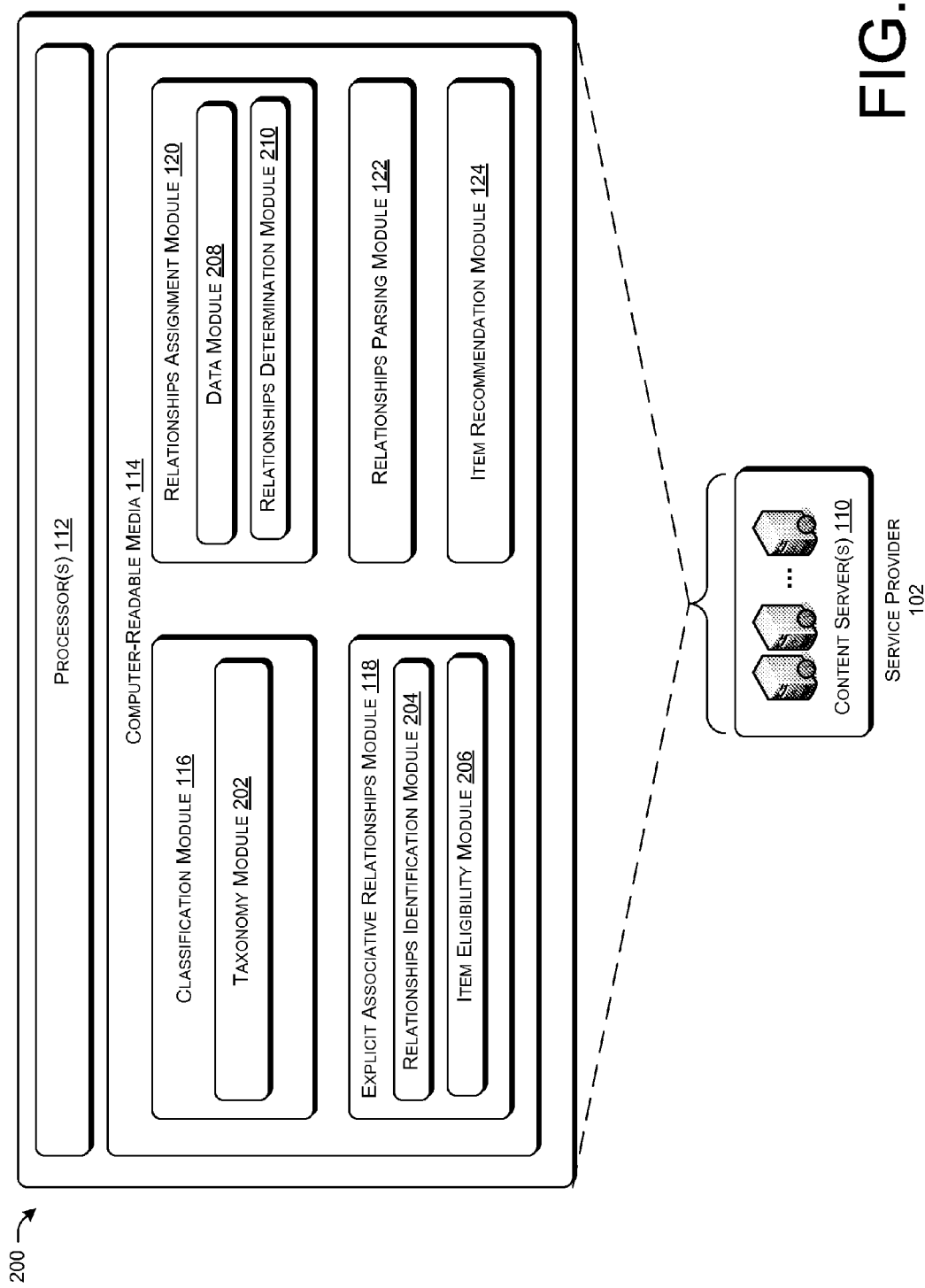
FIG. 2 is a diagram showing an example system that includes one or more content servers that define and determine explicit associative relationships between items and recommend items to consumers based on the explicit associative relationships.

FIG. 2 illustrates a diagram 200 illustrating an example content server, such as one or more of the content servers 110. As stated above with respect to FIG. 1, the content server 110 may be maintained by, or associated with, the service provider 102. Moreover, the content server 110 may include one or more processor(s) 112 and a computer-readable media 114, which may include the classification module 116, the explicit associative relationships module 118, the relationships assignment module 120, the relationships parsing module 122 and the item recommendation module 124.

As discussed above with respect to FIG. 1, the classification module 116 may create and establish relationships between items 126 and/or categories of items 126. Moreover, and as shown in FIG. 2, the classification module 116 may include a taxonomy module 202. The taxonomy module 202 may determine a taxonomy or classification structure that illustrates the relationships between different items 126 and/or categories of items 126. The taxonomy module 202 may maintain these relationships so that the service provider 102 may subsequently recommend relevant items 126 to consumers.

In various embodiments, the taxonomy module 202 may classify or define relationships between the items 126 and/or categories of items 126 in numerous different ways. For example, the taxonomy module 202 may assign equivalence relationships between items 126 and/or categories of items 126. Two items 126 and/or categories of items 126 may be determined to be equivalent if they are the same or are similar. Moreover, two items 126 and/or categories of items 126 may have a hierarchical relationship if a first item 126 within a first category of items 126 is included in a broader second category of items 126. Here, the broader category of items 126 (e.g., guitars) may be considered a parent category and the more narrow category of items 126 (e.g., electric guitars) may be referred to as a child category. In addition, associative relationships may indicate that an item 126 and/or a category of items 126 is related to a different item 126 and/or a different category of items 126, but that the relationship is different from an equivalence relationship or a hierarchical relationship. That is, the two items 126 and/or category of items 126 may have some affinity towards one another that may not be defined or explicit.

Therefore, the explicit associative relationships module 118 may create or establish explicit associative relationships 128 that may be assigned between items 126 and/or categories of items 126. More particularly, a relationships identification module 204 may establish a type of relationship (i.e., explicit associative relationships 128) that may supplement hierarchical and equivalence relationships between items 126 and/or categories of items 126. The specialized explicit associative relationships 128 may have rich semantic meaning that indicate the nature of the relationships between the items 126 and/or the categories of items 126. To do so, the relationships identification module 204 may define a controlled vocabulary of associative relation types that collectively address relations among items 126 and/or categories of items 126 in a retail electronic commerce ("e-commerce") context.

In certain embodiments, a product taxonomy may include multiple named categories that are associated with products (and/or services) that are hierarchically related (e.g., "Guitars" (broad term) and "Electric Guitars" (narrow term)). As stated above, an associative relationships links concepts that are not hierarchically or equivalence related, but are semantically or conceptually associated to such an extent that a link between them should be made explicit. For instance, "Electric Guitars" and "Electric Guitar Strings" may be related since electric guitar strings are essential for using an electric guitar, but these two categories of products do not appear to be hierarchically related (e.g., guitar strings are not a type of electric guitar, and vice versa). Here, electric guitar strings are a type of accessory for an electric guitar. More particularly, electric guitar strings are a consumable accessory since they tend to wear out and then need to be periodically replaced. As a result, the explicit associative relationship 128 between the categories "Electric Guitars" and "Electric Guitar Strings" may indicate that the "Electric Guitar Strings" are a consumable accessory for the category "Electric Guitars" (e.g., "Electric Guitars 'hasAccessory-Consumable' Electric Guitar Strings"). Therefore, in order to define the nature of the relationship between two categories of items 126, the explicit associative relationship 128 may be an explicitly typed, or a fully qualified, associative relationship.

In various embodiments, the explicit associative relationships 128 may be created in a manual, automated or partially automated manner. In some embodiments, an individual having expertise in creating and/or maintaining a product taxonomy may create these semantically meaningful relationships. Various types of signals or data may be utilized to create the explicit associative relationships 128, which will be discussed in additional detail below.

In further embodiments, the item eligibility module 206 may determine which items 126 and/or categories of items 126 are eligible to be assigned explicit associative relationships 128. Alternatively, or in addition, each item 126 and/or category of items 126 may be eligible to be assigned explicit associative relationships 128 with respect to other items 126, but the items 126 and/or the categories of items 126 may be prioritized. In some embodiments, higher priced items 126, including the categories in which those items 126 are included, and/or more complex or sophisticated items 126 may be eligible. These items 126 may be eligible over other items 126 since higher priced/more sophisticated items 126 may have an additional number of related items 126 (e.g., accessories, essential items 126, consumable items 126, etc.) and may have additional relationships with other items 126.

Upon determining a limited and controlled set of vocabulary that may serve as explicit associative relationships 128, the relationships assignment module 120 may assign those explicit associative relationships 128 between items 126 and/or categories of items 126. The explicit associative relationships 128 may be assigned in a manual, automated or partially automated manner and may be based on various types of data. In certain embodiments, a data module 208 of the relationships assignment module 120 may identify data that is utilized to create, maintain and assign the explicit associative relationships 128.

The data obtained by the data module 208 may include transactional data. Examples of transactional data may include data indicating that certain items 126 have commonly been purchased together, that users 108 typically navigate between items 126 and/or categories of items 126 successively via a website, that users 108 that purchase an item 126 also frequently view the same items 126, and so on. Other data may include data that indicates that certain items 126 have been searched for via the website. For instance, the data module 208 may cluster keyword searches to determine items 126 and/or categories of items 126 that are searched for in the same website session. In addition, the data may include natural language processing of category names that are included within the taxonomy maintained by the taxonomy module 202. For example, category names that have the same, or similar, terms may be useful in determining associative relationships between the categories of items 126. The data may also include input from the merchants 106, such as market trends and an indication of which categories of items 126 have affinities with one another.

The data module 208 may also obtain data regarding user interaction with the recommendations for items 126 that are presented to the users 108. As stated above with respect to FIG. 1, the service provider 102 may leverage the explicit associative relationships 128 in order to recommend relevant and related items 126 to the users 108. The data module 208 may determine an extent to which the users 108 interacted with those recommendations. For example, this user feedback may indicate whether the users 108 viewed, clicked on, or purchased the recommended items 126, whether the users 108 transitioned to different pages or tabs of the website, whether the users 108 abandoned the website following presentation of the recommended items 126, and so on. The feedback may then be used to improve the accuracy of the explicit associative relationships 128, such as by strengthening or weakening those relationships.

In various embodiments, a relationships determination module 210 may assign the explicit associative relationships 128 between the items 126 and/or the categories of items 126 based at least partly on the data obtained by the data module 208. That is, assuming that two items 126 or categories of items 126 are determined to have an affinity with one another, the relationships determination module 210 may select the appropriate explicit associative relationship 128 that defines the nature of the relationship between those items 126 or categories of items 126. The selection process may be performed manually by an individual (e.g., an individual associated with the service provider 102, a taxonomist, a subject matter expert, etc.) or in an automated or partially automated manner utilizing one or more algorithms. With respect to a first item 126, the relationships determination module 210 may determine whether other related items 126 are items 126 that are needed to properly use the first item 126 (i.e., essential items 126). The relationships determination module 210 may also determine whether the related items 126 are accessories to the first item 126, whether the related items 126 are optional items 126, meaning that those items 126 are related to the first item 126 but are not necessary for the use of the first item 126, whether the items 126 are consumable (e.g., the items 126 need to be replaced periodically), and so on.

As a result, the relationships determination module 210 may establish systematic definitions for the types of relationships between items 126 and/or categories of items 126. These systematic definitions may define the nature of the explicit associative relationship 128 between two items 126 and/or two categories of items 126. For instance, the explicit associative relationship 128 between two items 126 may indicate that one of the items 126 is essential for the use of the other item 126, that one of the items 126 is an accessory for the other item 126, that one of items 126 is consumable with respect to the other item 126, that one of the items 126 is suggested for the other item 126, but is not essential, that one of the items 126 is instructional media content for the other item 126, and so on. Therefore, the explicit associative relationship 128 between two items 126 and/or category of items 126 may reflect how the items 126/categories of items 126 are related to one another.

In some embodiments, the relationships determination module 210 may establish multiple tiers for the explicit associative relationships 128. For instance, regarding a first item 126, a first tier may specify that a second item 126 is an accessory of the first item 126. Then, a second tier may indicate whether the second item 126 is an essential accessory, a recommended accessory, an optional accessory, and so on. Therefore, the first tier may define a more general relationship between the two items 126 and a second tier may define a more specific or narrow relationship within the first tier. As an another example, a first tier of an explicit associative relationship 128 may indicate that an item 126 is media content, and a second tier of that explicit associative relationship 128 may indicate the type of media content. That is, the second tier may indicate whether the media content is textual, audio or video content, whether the media content is instructional, whether the media content is topical (e.g., the media content is about a particular topic relating to the item 126), etc.

As discussed above, the service provider 102 may offer for sale items 126 via a website, an application, a merchant marketplace, and so on. The relationships parsing module 122 may determine that a user 108 has interacted with or selected an item 126 and/or a category of items 126, such as by searching for, viewing, clicking on, purchasing, etc. the item 126/category of items 126. In response, the relationships parsing module 122 may determine items 126 and/or category of items 126 that are related to the item 126/category of items 126 that is selected or that is subject to the user interaction. That is, the relationships parsing module 122, possibly utilizing one or more algorithms, may fetch some or all of the explicit associative relationships 128 associated with the selected item 126 and/or category of items 126. The relationships parsing module 122 may then loop through each type of explicit associative relationship 128 (e.g., essential, accessory, suggested, consumable, etc.), and identify items 126 from each associated category that may serve as items 126 that may be recommended to the user 108.

The item recommendation module 124 may then display one or more of these recommended items 126 with appropriate qualifying labels (e.g., "must have" item 126, accessories, suggested items 126, etc.). That is, when the user 108 arrives at a item page or an item category page, the relationships parsing module 122 may parse or search the explicit associative relationships 128 relating to that item 126 in order to identify items 126 to recommend to the user 108, and then build a display that depicts the recommended items 126 and/or category of items 126 to the user 108.

In various embodiments, the item recommendation module 124 may recommend related and relevant items 126 to a user 108 based at least in part on the explicit associative relationships 128 associated with an item 126 and/or a category of items 126 that the user 108 has interacted with or is currently interacted with. More particularly, certain products are contingent on other products or services, meaning that that those products cannot be used properly without another product. For instance, provided that a user 108 purchased an electric guitar, the user 108 would also likely need an amplifier, guitar picks, replacement strings, etc., in order to play the electric guitar. That is, if a user 108 is purchasing an item 126 within a category of items 126 for the first time, the user 108 may be unaware of other products that the user 108 would also want to purchase. Therefore, by recommending these items 126 to the user 108, the service provider 102 may allow the user 108 to make more informed, educated and intelligent purchasing decisions. Accordingly, if the user 108 purchases, or is about to purchase, an electric guitar for the first time, the item recommendation module 124 may recommend other items 126 that are commonly purchased with electric guitars (e.g., replacement strings, picks, etc.), essential items 126 or accessories (e.g., an amplifier, guitar effects, etc.), optional items 126 or accessories (e.g., a guitar case or bag, a guitar stand, etc.), media content (e.g., instructional media, topical media, etc.), and so on.

In various embodiments, the items 126 that are recommended to the user 108 may be based at least in part on characteristics associated with the item 126 that the user 108 has selected or is interacting with, such as a brand or price of the item 126. More particularly, the items 126 that are recommended to the user 108 may be commensurate and appropriate in view of the item 126 selected by the user 108. In some embodiments, brand and price of the items 126 may serve as attributes that can be used to define the affinities between two categories of items 126. That is, if it is determined that two product categories have an affinity with respect to one another, then the service provider 102 can utilize brand and price to further define the affinity. For example, provided that a user 108 has or is about to purchase a particular electric guitar, the item recommendation module 124 may recommend a particular brand or price of amplifier due to those products having an affinity with one another. That is, if the user 108 purchased a relatively high priced electric guitar, the item recommendation module 124 may recommend higher quality and priced amplifiers. Similarly, if the user 108 purchased a particular brand of electric guitar, the item recommendation module 124 may recommend amplifiers of a particular brand that is frequently purchased with that brand of electric guitar.

Therefore, the particular brand of the selected item 126 may determine or influence which items 126 are recommended to the user 108. That is, the service provider 102 may recommend items 126 of a brand that has an affinity with the brand of the selected item 126. In some embodiments, such an affinity may be based on transactional data. For example, the service provider 102 may determine that different brands of items 126 are commonly purchased together. As a result, if a user 108 selects an item 126 of a first brand, and consumers typically purchase items 126 of the first brand and items 126 of a second brand together, the service provider 102 may then recommend items 126 having the second brand. In other embodiments, the affinities may be based on the nature of business relationships or business structures relating to sources (e.g., sellers, manufacturers, etc.) of the items 126. For instance, assume that a user 108 selects an electric guitar that is made or sold by a first company. Further assume that a certain brand of electric guitar amplifiers is made or sold by a second company that is a subsidiary of the first company. Due to this business relationship, the service provider 102 may recommend to the user 108 amplifiers that are made or sold by the second company.

As stated above, the service provider 108 may attempt to recommend items 126 having a price that is commensurate with the price of the selected item 126. That is, the service provider 102 may want to recommend items 126 having a lower price when the selected item 126 is lower in price, and vice versa. In some embodiments, the service provider may determine a distribution of prices within categories of items 126. For instance, the service provider 102 may determine tiers of prices within a particular category of items 126. In this instance, the category of electric guitars may have three pricing tiers—high priced, medium priced and low priced. The service provider 102 may also determine pricing tiers in categories of items 126 that are related to electric guitars, such as electric guitar amplifiers. The pricing tiers in different categories of items 126 may correspond to one another, such that a high price tier in the electric guitar category may correspond to a high price tier in the amplifier category. As a result, if an electric guitar within the high priced tier is selected by a user 108, the service provider 102 may recommend amplifiers within the high priced tier of the amplifier category.

Recommending items 126 based on explicit associative relationships 128 may be beneficial for products that typically have high return rates. More particularly, by recommending products that are related to a particular product that is to be purchased, the service provider 102 may allow users 108 to make more informed purchasing decisions, which may reduce the likelihood that users 108 will return those products. For example, if a user 108 has purchased, or is about to purchase, an electronic guitar, it may be beneficial to inform the user 108 that an amplifier, picks, etc., are products that are essential to the use of an electric guitar. Without knowing such information, the user 108 may first purchase the electric guitar, realize that additional products are needed, and then decide to return the electric guitar. Therefore, by recommending related items 126, the service provider 102 may educate the consumer, up sell related products, and possibly reduce the amount of product returns.

As stated above, the item recommendation module 124 may present the recommended items 126 in any manner via a website, application, etc. In some embodiments, the service provider 102 may desire to limit the presentation of recommended items 126 to users 108 that are new shoppers with the service provider 102 or to users 108 that are searching for, viewing, purchasing, etc., their first item 126 within a particular item category. If the service provider 102 is successfully able to identify a user 108, the service provider 102 may determine whether to present recommended items 126 based on the user's 108 behavior (e.g., search history, browse history, viewing history, purchase history, etc.). For instance, provided that a user 108 has logged into a user account associated with the service provider 102, the service provider 102 may have access to that user's 108 recent behavior with respect to the website and display recommendations accordingly.

However, the service provider 102 may not have access to such information if the user 108 is anonymous (e.g., has not signed into a user account) or if the user 108 is a new shopper with respect to the service provider 102. In these embodiments, the service provider 102 may monitor the actions of the user 108 and obtain behavioral data about the user 108 for the purpose of determining whether to recommend items 126 for the user 108. For example, the service provider 102 may determine website navigation patterns associated with the user 108 and then infer their expertise or experience. In particular, from the behavioral data, one or more algorithms may determine whether the user 108 is a new shopper and/or whether the user 108 has previously purchased items 126 within different categories. In some embodiments, based on the historical behavioral data of users 108, the service provider 102 may assign the users 108 into different categories, whereby the categories determine whether those users 108 are to be presented with item recommendations. That is, upon determining the behavioral history of a user 108, that user 108 may be placed in an appropriate category, which may cause the service provider 102 to either display or not display recommended items 126.

In addition, the service provider 102 may display recommended items 126 to new customers as a default option. Then, as additional information is learned about those users 108, the service provider 102 may place those users 108 in various categories, which may determine whether the recommended items 126 are displayed or not. Therefore, as additional information is known about a user 108 (e.g., the user 108 signs in, navigation history, etc.), the service provider 102 may dynamically adjust whether the item recommendation component is displayed to the user 108.

Example Explicit Associative Relationships

FIG. 3 illustrates a diagram 300 that shows example associative relationships between an item and a plurality of related items. More particularly, the diagram 300 illustrates a list of item(s) 302, a list of related item(s) 304 and a list of example explicit associative relationships 306 between the item 302 and the related items 304. Here, the item 302 is an electric guitar and the related items 304 include items that can be utilized in association with electric guitars, such as a guitar amplifier, a guitar stand, a guitar strap, guitar picks, electric guitar strings, a guitar bag, a guitar case, guitar effects and instructional media.

In various embodiments, assume that a user 108 is accessing a website (or an application) associated with the service provider 102. While accessing the website, the user 108 may navigate to various webpages that are related to items 126 (e.g., products, services, etc.) and categories of items 126. In addition, the user 108 may search for, view, select, browse to, and/or purchase an item 126 via the website. For the purpose of this discussion with respect to FIG. 3, such actions may be referred to as selecting an item 126. As shown in FIG. 3, the user 108 has selected a particular item 302—an electric guitar.

In response to determining that the user 108 has selected the electric guitar, the service provider 102 may identify other items 126 that are related to the selected electric guitar (i.e., the related items 304). Moreover, the service provider 102 may determine explicit associative relationships 306 between the electric guitar and each of the related items 304, where the explicit associative relationships 306 may define the nature of the relationship between the item 302 and the related items 304. For instance, the explicit associative relationships 306 may indicate whether the related items 304 are equipment, accessories or media with respect to the selected item 302. The explicit associative relationships 306 may also indicate whether the related items 304 are essential to the use of the selected item 304, are consumable, are recommended/suggested, are instructional, and so on. That is, the explicit associative relationships 306 may be a limited or controlled vocabulary that explicitly defines or fully qualifies the relationships between the selected item 302 and the related items 304.

The explicit associative relationships 306 illustrated in FIG. 3 are merely examples and it is contemplated that additional related items 304 and other explicit relationships 306 may apply. As shown, the guitar amplifier may be considered essential equipment since an amplifier is a piece of equipment utilized with the electric guitar and is necessary for the proper use or play of the electric guitar. Moreover, a guitar stand and a guitar strap may be considered essential accessories because they are each separate products utilized in conjunction with the electric guitar. Moreover, both a guitar stand and a guitar strap are important for both playing the electric guitar safely (e.g., the guitar strap) and also preventing damage to the electric guitar when the electric guitar is not being used (e.g., the guitar stand). In other embodiments, guitar picks and electric guitar strings may be considered consumable accessories since those products may wear out, break, or be misplaced, which may require the user 108 to periodically replace those products in order to continue playing the electric guitar. A guitar bag and a guitar case may be considered recommended accessories because they are not necessary for playing the electric guitar, but are useful for storing and transporting the electric guitar while minimizing the likelihood of damaging the electric guitar. Moreover, since guitar effects may include electronic devices that alter how the electric guitar sounds, this product may be considered recommended equipment for the electric guitar.

Items 304 related to the electric guitar may also include instructional media, which may assist the user 108 in learning to play the electric guitar or improving one's ability to play the electric guitar. The instructional media may include various types of media content, such as textual content (e.g., books, magazines, etc.), video content (e.g., DVDs, etc.), audio content (e.g., CDs), computer programs (e.g., computer software, etc.), and so on. Therefore, with respect to instructional media, the explicit associative relationships 306 may include instructional media relating to guitar books, guitar DVDs, and guitar software, among other items. Although not shown, other types of media may also be included, such as topical media that includes media content that is not instructional but that relates to electric guitars.

Therefore, the explicit associative relationships 306 illustrated in FIG. 3 may define or explain the relationship between the selected item 302 and the related items 304. Although specific language is utilized to illustrate the explicit associative relationships 306, a different vocabulary or different language may be utilized to define such associative relationships. Based at least in part on the explicit associative relationships 306 associated with a particular selected item 302, the service provider 102 may recommend relevant and appropriate related items 304 to the user 108.

Example Item Recommender

Figure 4:
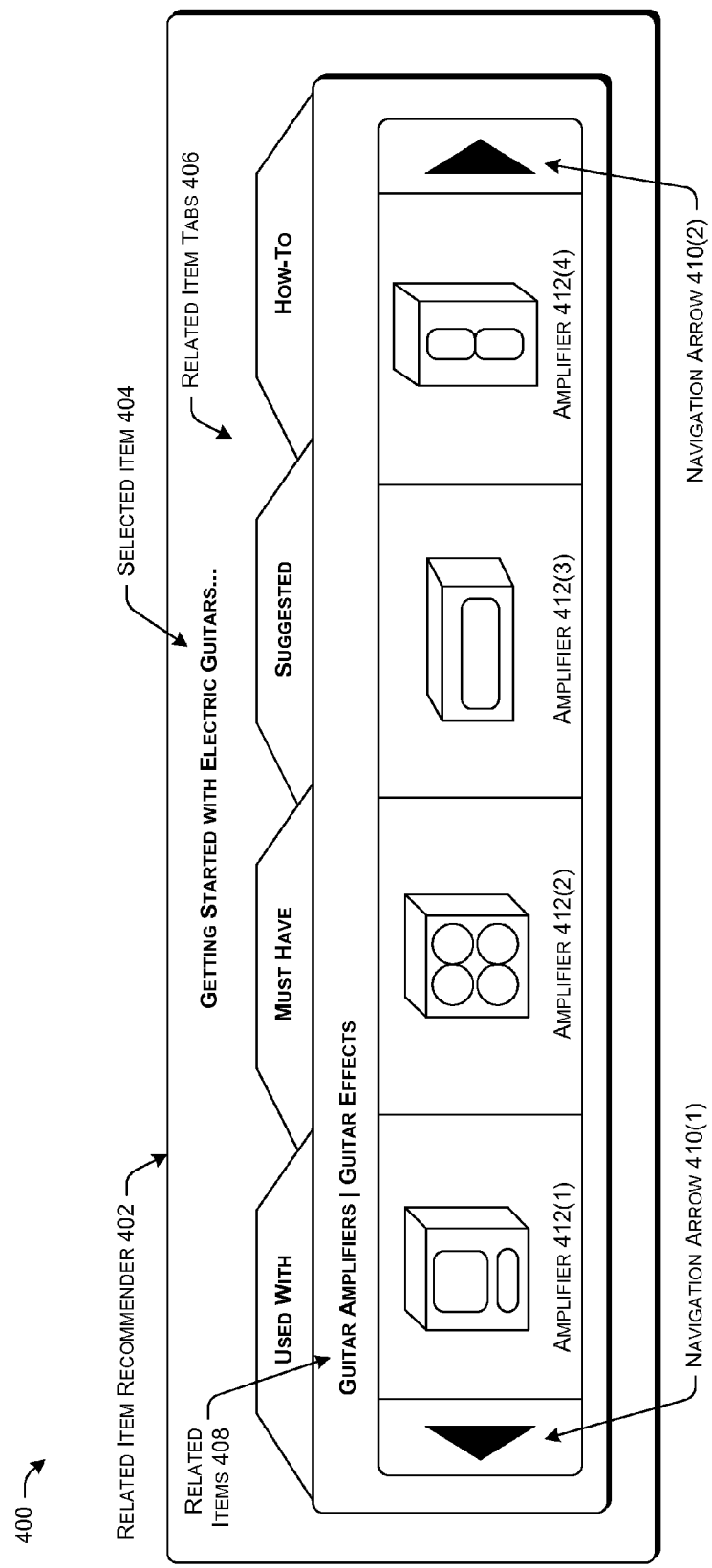
FIG. 4 is a diagram showing an example item recommender that may be presented to consumers for the purpose of recommending items to the consumers.

FIG. 4 illustrates a diagram 400 that shows an example user interface, component, module, widget, etc., that recommends items (e.g., products, services, etc.) to consumers. In particular, FIG. 4 illustrates a related item recommender 402, which includes a selected item 404, related item tabs 406, related items 408 and navigation arrows 410(1) and 410(2). Here, the related item recommender 402 may recommend items 408 to a user 108 in response to determining that the user 108 has selected an item 404 and based at least partly on explicit associative relationships 128 between the selected item 404 and the related items 408.

As stated above, the selected item 404 may be an item 126 or a category of items 126 that the user 108 has navigated to, searched for, selected (e.g., clicked on), viewed, purchased, etc. In the embodiment illustrated in FIG. 4, the user 108 has selected an electric guitar. As such, the related item recommender 402 may be presented to the user 108, such as via a website or an application being accessed by the user 108. The related item recommender 402 may state "Getting Started with Electric Guitars," which may inform the user 108 that the service provider 102 is attempting to identify items 126 related to electric guitars that may be of interest to the user 108. Since various types of items 126 may be related to electric guitars, the related item recommender 402 may include one or more related item tabs 406, pages, pop-up windows, etc., that separately display these items 126. The related item tabs 406 may also categorize the related items 408 into different tabs or categories based on the nature of their relationships with the selected item 404. As a result, the user 108 may select different related item tabs 406 that include different related items 408 and related items 408 that have different uses with respect to electric guitars.

The related item tabs 406 may be dynamic and may be customized for each item 126 and/or category of items 126 that are selected by a user 108. Although any number of related item tabs 406 may be present, the related item tabs 406 illustrated in FIG. 4 include a "Used With" tab, a "Must Have" tab, a "Suggested" tab and a "How-To" tab. Each of these related item tabs 406 correspond to and represent different products and/or services that may be related to electric guitars. In addition, each of the related item tabs 406 may be associated with different explicit associative relationships 128 that have been assigned between the selected item 404 and the particular related items 408 within the related item tabs 406. As shown, the related item tab 406 being displayed to the user 108 is the "Used With" tab, which may include recommendations for related items 126 that are used with electric guitars. This related item tab 406 displays multiple different guitar amplifiers 412(1)-412(4) and guitar effects (not shown) that may be used with the selected electric guitar. The user 108 may utilize the navigation arrows 410(1) and 410(2) in order to navigate to or scroll between the different guitar amplifiers and guitar effects.

Moreover, the "Must Have" related item tab 406 may include related items 408 that are essential to the operation or use of electric guitars. Such related items 408 may include a guitar stand or a guitar strap, and may also include guitar amplifiers and guitar effects. The "Suggested" related item tab 406 may include related items 408 that are not necessary to play or use an electric guitar, but may nonetheless be recommended for a user 108 that is purchasing an electronic guitar. Examples of suggested or recommended related items 408 may include guitar picks, a guitar bag or case, extra electric guitar strings, and other accessories that may be utilized with electric guitars or that may enhance a user's 108 experience with respect to an electric guitar. Additionally, the "How-To" related item tab 406 may include media content (e.g., books, magazines, DVDs, computer software, etc.) that may allow the user 108 to learn how to play, or to improve upon playing, an electric guitar.

Therefore, the item recommender 402 may recommend items 126 to a user 108 based on a particular item 126 that the user 108 browsed/navigated to or otherwise interacted with. The related items 408 recommended to the user 108 may be determined based on semantically defined explicit associative relationships 128 between the selected item 404 and each of the related items 408, where the explicit associative relationships 128 define the nature of the relationships between the selected item 404 and the related items 408. As a result, the user 108 may receive recommendations for related items 408 that are characterized based on their relationships to the selected item 404.

In addition, the related item recommender 402 may be displayed via a website, application, etc., that a user 108 is accessing to search for, view, click on, purchase, etc., the selected item 404. The related item recommender 402 may be displayed via a product detail page that includes information about a particular product or category of products, or on a browse category listing page. On a browse category listing page, the service provider 102 may display a set of links to relevant categories of items 126 and information (e.g., a label) that indicates or expresses the nature of the relationships. The service provider 102 may also present a series of sliders that display selected items 404 within those item categories. Moreover, the related item recommender 402 may be displayed depending upon whether the user 108 is a new shopper or whether the user 108 selects an item 126 in a category that is new or unfamiliar to the user 108.

Moreover, FIG. 4 illustrates an example of how the related items 408 may be recommended to consumers and it is contemplated that the related items 408 may be recommended to consumers in any manner.

Example Processes

Figure 5:
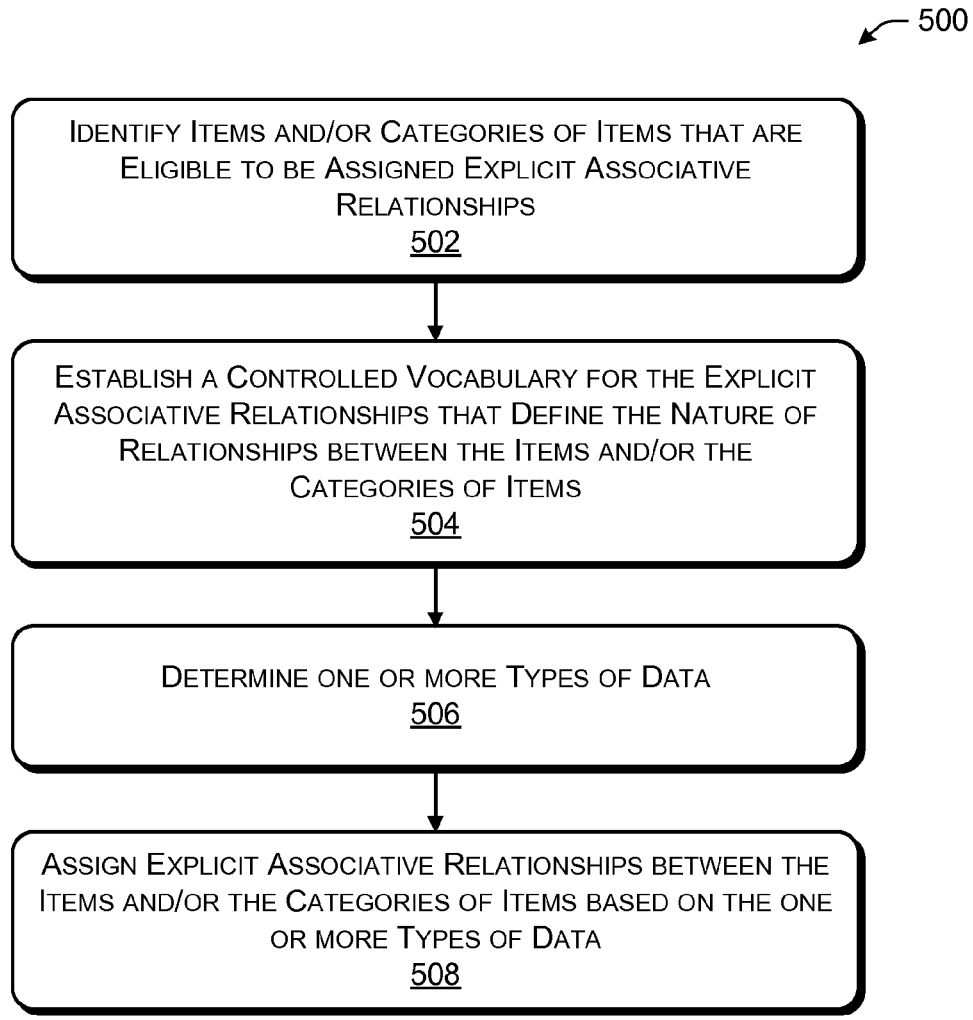
FIG. 5 is a flow diagram showing an example process of assigning explicit associative relationships between items and/or categories of items.
Figure 6:
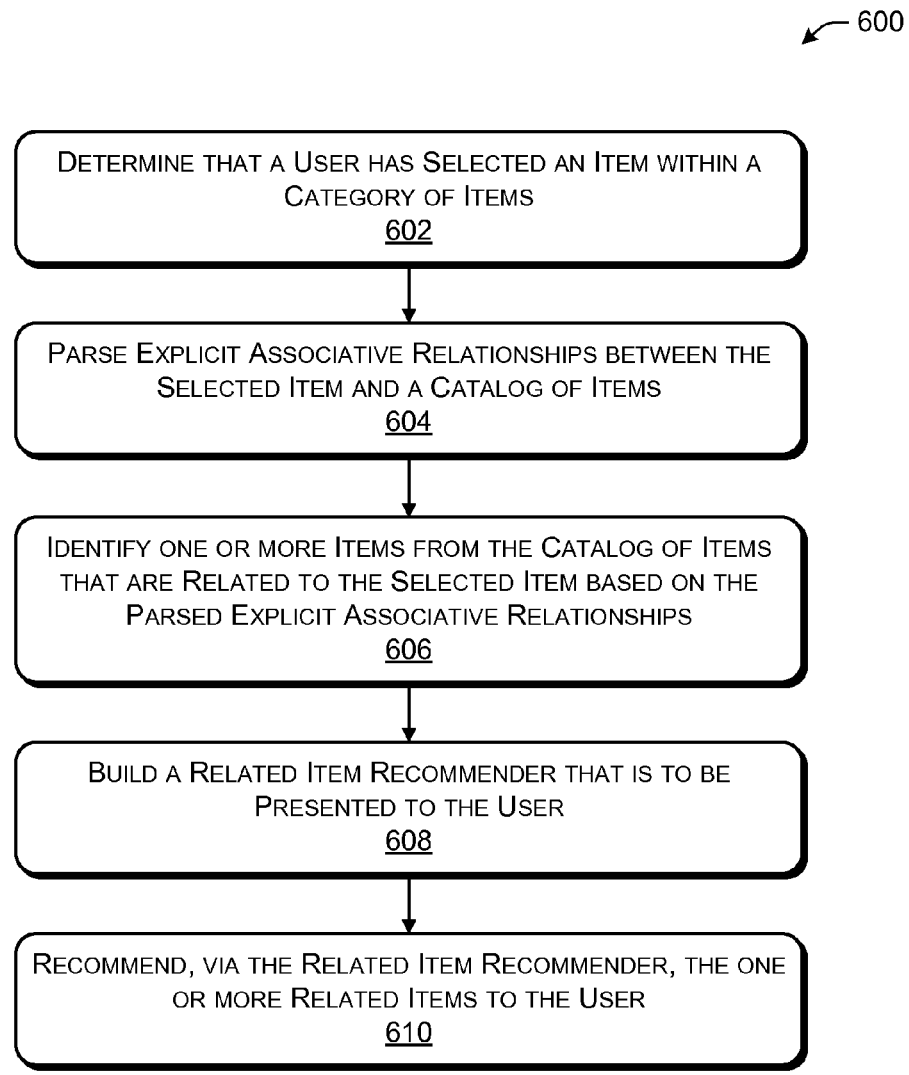
FIG. 6 is a flow diagram showing an example process of recommending items and/or categories of items to a consumer based on explicit associative relationships associated with an item that is selected by a consumer.

FIGS. 5 and 6 describe example processes of presenting recommendations for items to a user based on explicitly defined associative relationships. The example processes are described in the context of the environment of FIGS. 1-4 but are not limited to those environments. The processes are illustrated as logical flow graphs, each operation of which represents a sequence of operations that can be implemented in hardware, software, or a combination thereof. In the context of software, the operations represent computer-executable instructions stored on one or more computer-readable media that, when executed by one or more processors, perform the recited operations. Generally, computer-executable instructions include routines, programs, objects, components, data structures, and the like that perform particular functions or implement particular abstract data types.

The computer-readable media may include non-transitory computer-readable storage media, which may include hard drives, floppy diskettes, optical disks, CD-ROMs, DVDs, read-only memories (ROMs), random access memories (RAMs), EPROMs, EEPROMs, flash memory, magnetic or optical cards, solid-state memory devices, or other types of storage media suitable for storing electronic instructions. In addition, in some embodiments the computer-readable media may include a transitory computer-readable signal (in compressed or uncompressed form). Examples of computer-readable signals, whether modulated using a carrier or not, include, but are not limited to, signals that a computer system hosting or running a computer program can be configured to access, including signals downloaded through the Internet or other networks. Finally, the order in which the operations are described is not intended to be construed as a limitation, and any number of the described operations can be combined in any order and/or in parallel to implement the process.

FIG. 5 is a flow diagram illustrating an example process 500 of determining and assigning explicit associative relationships between items. Moreover, the following actions described with respect to FIG. 5 may be performed by the service provider 102 or the content servers 110, as shown in FIGS. 1-4.

Block 502 illustrates identifying items and/or categories of items that are eligible to be assigned explicit associative relationships. In various embodiments, the service provider 102 may identify items 126 (e.g., products, services, etc.) and/or categories of items 126 that may be more appropriate to be associated with explicit associative relationships 128 with respect to other items 126 and/or other categories of items 126. For instance, the service provider 102 may determine that higher priced items 126 or more sophisticated items 126 may be eligible, and that other items 126 may not.

Block 504 illustrates establishing a controlled vocabulary for the explicit associative relationships that define the nature of relationships between the items and/or the categories of items. More particularly, the service provider 102 may establish a controlled and limited vocabulary that explicitly defines and explains associative relationships between items 126 and/or categories of items 126. For instance, this vocabulary may indicate the type of relationship between two items 126 (e.g., equipment, accessory, consumable, media content, etc.) and the importance of one of the items 126 to the other item 126 (e.g., essential, suggested, recommended, instructional, etc.). As a result, the service provider 102 may have access to a limited number of defined relationships that may be assigned between different items 126.

Block 506 illustrates determining one or more types of data. The service provider 102 may obtain various types of data that it may utilized to establish the vocabulary for the explicit associative relationships 128 and/or to assign the explicit associative relationships 128 between items 126 and/or categories of items 126. As discussed above, the data may include transactional data, keyword search data, category name data, merchant input, etc.

Block 508 illustrates assigning explicit associative relationships between the items and/or the categories of items based on the one or more types of data. In certain embodiments, the service provider 102 may assign the explicit associative relationships 128 between items 126 and/or categories of items 126 in a manual, automated, or partially automated manner, possibly by utilizing one or more algorithms. The process of assigning the explicit associative relationships 128 may be performed by a subject matter expert (e.g., a taxonomist) and be based on the data obtained by the service provider 102. As a result, the service provider 102 may maintain explicitly defined, fully qualified and semantically rich associative relationships between various items 126 and/or categories of items 126.

FIG. 6 is a flow diagram illustrating an example process 600 of assigning explicit associative relationships between a selected item and one or more related items. Moreover, the following actions described with respect to FIG. 6 may be performed by the service provider 102 or the content servers 110, as shown in FIGS. 1-4.

Block 602 illustrates determining that a user has selected an item within a category of items. In various embodiments, the service provider 102 may determine whether a user 108 that is accessing a website or an application associated with the service provider 102 has searched for, browsed/navigated to, viewed, clicked on and/or purchased an item 126 within a category of items 126, which may be referred to as the selected item 126.

Block 604 illustrates parsing explicit associative relationships between the selected item and a catalog of items. In response to determining that the user 108 has selected an item 126, the service provider 102 may parse or search for explicit associative relationships 128 between the selected item 126 and other items 126 that may be related to the selected item 126.

Block 606 illustrates identifying one or more items from the catalog of items that are related to the selected item based on the parsed explicit associative relationships. In various embodiments, based at least partly on the explicit associative relationships 128, the service provider 102 may identify items 126 that are related to the selected item 126, such as equipment, accessories, consumable items 126, media content, etc., that is essential, recommended, suggested, instructional, etc., with respect to the selected item 126.

Block 608 illustrates building a related item recommender that is to be presented to the user. Upon identifying the related and recommended items 126, the service provider 102 may generate a related item recommender 402 that may be presented or displayed to the user 108 via the website or application that the user 108 is accessing.

Block 610 illustrates recommending, via the related item recommender, the one or more related items to the user. In some embodiments, the related item recommender 402 may display items 126 related to the selected item 126 and characterize or categorize the related items 126 based on the nature of their relationship to the selected item 126. As a result, the user 108 may be able to make a more informed and intelligent purchasing decision, and the service provider 102 may obtain additional revenue resulting from the purchase of the related items 126.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as illustrative forms of implementing the claims.

What is claimed is:

1. A system comprising:
one or more processors;
memory;
a classification module maintained in the memory and executable by the one or more processors to maintain a taxonomy for a catalog of products;
an explicit associative relationships module maintained in the memory and executable by the one or more processors to determine a plurality of explicit associative relationships, wherein the plurality of explicit associative relationships include words or phrases that define a plurality of different types of relationships between products included in the catalog of products, the plurality of different types of relationships including at least one of:
an optional accessory relationship that indicates that a first product is both suggested for use with a second product and not necessary for to using the second product,
a necessary accessory relationship that indicates that the first product is necessary for using the second product, or
a consumable accessory relationship that indicates that the first product is consumed during use of the first product in conjunction with the second product;
a relationships assignment module maintained in the memory and executable by the one or more processors to assign the plurality of explicit associative relationships to one or more pairings of the products;
a relationships parsing module maintained in the memory and executable by the one or more processors to:
determine that a user has selected the second product; and
parse the explicit associative relationships assigned to the second product to identify that the first product is related to the second product; and
an item recommendation module maintained in the memory and executable by the one or more processors to recommend the first product to the user and to explain a nature of at least one of the optional accessory relationship, the necessary accessory relationship, or the consumable accessory relationship assigned to the second product with respect to the first product.

2. The system as recited in claim 1, wherein at least some of the plurality of explicit associative relationships indicate a type of the first product and an importance of the first product to using the second product.

3. The system as recited in claim 2, wherein the importance of the first product to using the second product corresponds to an extent to which the first product is recommended to the user.

4. The system as recited in claim 1, wherein the relationships parsing module is further executable to determine that the user has navigated to, browsed to, searched for, viewed, clicked on, or purchased the second product or a category of products associated with the second product.

5. The system as recited in claim 1, wherein one or more related products are presented to the user in different categories based at least partly on the explicit associative relationships between the second product and the one or more related products.

6. A method comprising:
under control of one or more processors:
determining a plurality of explicit associative relationships that include words or phrases that define a plurality of different types of relationships between at least one of (i) items of a catalog of items, or al categories of the items, wherein the plurality of explicit associative relationships are different than a plurality of hierarchical relationships between at least one of the items or the categories of the items, and wherein the plurality of different types of relationships include at least one of:
an optional accessory relationship that indicates that at least one of a first item or a first category of items is both suggested for use with a second item and not necessary for using the second item,
a necessary accessory relationship that indicates that at least one of the first item or the first category of items is necessary for using the second item, or
a consumable accessory relationship that indicates that at least one of the first item or the first category of items is consumed during use in conjunction with the second item; and
assigning the plurality of explicit associative relationships to at least one of the items or the categories of items, the plurality of explicit associative relationships being utilized to recommend, to one or more users, at least one of the first item or the first category of items based on the second item having been selected by a user of the one or more users;
parsing the plurality of explicit associative relationships assigned to the second item to identify that at least one of the first item or the first category of items is related to the second item; and
transmitting, to the user, an explanation of a nature of at least one of the optional accessory relationship, the necessary accessory relationship, or the consumable accessory relationship assigned to the first item or the first category of items with respect to the second item.

7. The method as recited in claim 6, further comprising:
determining data that corresponds to at least one of transactional data, merchant input, data from a subject matter expert, keyword search data, or category name data; and
assigning the plurality of explicit associative relationships based at least partly on the data.

8. The method as recited in claim 6, further comprising:
determining which of the items or the categories of items are eligible to be assigned an explicit associative relationship of the plurality of explicit associative relationships; and
assigning the explicit associative relationship between the items or the categories of items that are determined to be eligible.

9. The method as recited in claim 6, wherein the plurality of explicit associative relationships are determined by one or more algorithms utilizing an automated or partially automated process.

10. The method as recited in claim 6, further comprising:
determining that the user has selected the second item via a site or an application associated with a service provider;
parsing the explicit associative relationships between the second item and the items to determine that the first item or the first category of items are related to the second item; and
dynamically recommending at least one of the first item or the first category of items to the user via the site or the application.

11. The method as recited in claim 6, further comprising:
determining that the user has selected a particular category of items of the categories of items via a site or an application associated with a service provider;
parsing the explicit associative relationships between the particular category of items and the categories of items to determine one or more other categories of items that are related to the particular category of items; and
dynamically recommending at least one of the one or more other categories of items to the user via the site or the application.

12. The method as recited in claim 6, wherein at least one of the first item or the first category of items are recommended to the one or more users via a user interface, a widget, one or more windows, one or more tabs, or one or more pages provided by a site or application associated with a service provider.

13. One or more non-transitory computer-readable media having computer executable instructions that, when executed by one or more processors, cause the one or more processors to perform operations comprising:
determining that a user has interacted with a first item of a catalog of items;
parsing explicit associative relationships between the first item and at least one type of related items from the catalog of items, the explicit associative relationships including words or phrases that define a relationship between the first item and the at least one type of related items, wherein the relationship is at least one of:
an optional accessory relationship that indicates that the at least one type of related items are both suggested for use with the first item and not necessary for using the first item,
a necessary accessory relationship that indicates that the at least one type of related items are necessary for using the first item, or
a consumable accessory relationship that indicates that the at least one type of related items is consumed during use in conjunction with the first item;
based at least partly on the parsing, identifying, in the other items, related items that are determined to be usable in conjunction with the first item; and
presenting, to the user, one or more recommendations that identify at least some related items of the at least one type of related items, wherein the one or more recommendations include an explanation of a nature of the relationship.

14. The one or more non-transitory computer-readable media as recited in claim 13, wherein the operations further comprise:
identifying a category of items in which the first item is included;
determining that the user has not purchased an item within the category of items; and
at least partly in response to determining that the user has not purchased the item within the category of items, presenting the one or more recommendations to the user.

15. The one or more non-transitory computer-readable media as recited in claim 13, wherein the operations further comprise:
determining that the user interacted with the first item via a website or an application associated with a service provider;
determining that the user has not purchased an item of the related items from the service provider; and
at least partly in response to determining that the user has not purchased the item of the related items from the service provider, presenting the one or more recommendations to the user.

16. The one or more non-transitory computer-readable media as recited in claim 13, wherein the determining that the user has interacted with the first item includes determining that the user has navigated to, browsed to, searched for, viewed, clicked on, or purchased the first item or a category of items in which the first item is included.

17. The one or more non-transitory computer-readable media as recited in claim 13, wherein the one or more recommendations are based at least partly on:
a brand of the first item, the brand of the first item having a determined affinity with brands of the related items, the determined affinity being based at least partly on transactional data or a business relationship between a source of the first item and one or more sources of the related items; or
a price of the first item, the price of the first item being commensurate with prices of the related items.

18. The one or more non-transitory computer-readable media as recited in claim 13, wherein the one or more recommendations are categorized based at least partly on the explicit associative relationships associated with the related items.

19. The one or more non-transitory computer-readable media as recited in claim 13, wherein the operations further comprise:
determining that the user has interacted with the first item via a website or an application associated with a service provider; and
dynamically presenting the one or more recommendations via the website or the application in response to determining that the user has interacted with the first item.

20. The one or more non-transitory computer-readable media as recited in claim 13, wherein the explicit associative relationships include different explicit associative relationships such that the first item and a second item of the catalog of items have a first type of explicit associative relationship and the first item and a third item of the catalog of items have a second type of explicit associative relationship.

* * * * *